United States Patent
Chau et al.

(10) Patent No.: US 7,653,034 B2
(45) Date of Patent: Jan. 26, 2010

(54) SYSTEM AND METHOD FOR CONTROLLING ACCESS TO A WIRELESS MEDIUM

(75) Inventors: Sammy Ming Kit Chau, Kowloon (HK); Soung C. Liew, Hong Kong (CN); Vincent Lau, Hong Kong (CN)

(73) Assignee: Hong Kong Applied Science and Technology Research Institute Co., Ltd., Hong Kong (CN)

( * ) Notice: Subject to any disclaimer, the term of this patent is extended or adjusted under 35 U.S.C. 154(b) by 809 days.

(21) Appl. No.: 10/984,172

(22) Filed: Nov. 9, 2004

(65) Prior Publication Data

US 2006/0099990 A1 May 11, 2006

(51) Int. Cl.
*H04W 4/00* (2009.01)
(52) U.S. Cl. .................. 370/338; 370/235; 370/346
(58) Field of Classification Search ........... 370/235, 370/329, 338
See application file for complete search history.

(56) References Cited

U.S. PATENT DOCUMENTS

| | | | |
|---|---|---|---|
| 6,747,968 B1* | 6/2004 | Seppala et al. | 370/338 |
| 7,251,232 B1* | 7/2007 | Meier | 370/338 |
| 2002/0025818 A1* | 2/2002 | Kang et al. | 455/450 |
| 2003/0035385 A1* | 2/2003 | Walsh et al. | 370/316 |
| 2003/0035436 A1* | 2/2003 | Denecheau et al. | 370/452 |
| 2004/0114562 A1* | 6/2004 | Kim | 370/338 |
| 2004/0125775 A1* | 7/2004 | Rios | 370/338 |
| 2005/0036466 A1* | 2/2005 | Malik et al. | 370/338 |
| 2005/0135318 A1* | 6/2005 | Walton et al. | 370/338 |
| 2005/0180444 A1* | 8/2005 | Gu et al. | 370/412 |
| 2006/0009229 A1* | 1/2006 | Yuan et al. | 455/452.1 |
| 2008/0019329 A1* | 1/2008 | Benveniste | 370/337 |

FOREIGN PATENT DOCUMENTS

| | | |
|---|---|---|
| WO | WO/02/13442 | 2/2002 |
| WO | WO/03/026221 | 3/2003 |
| WO | WO/2004/038980 | 5/2004 |

OTHER PUBLICATIONS

International Search Report issued for PCT/CN2005/001878 dated Mar. 2, 2006.
Goyal, P., et al., "Start-time Fair Queuing: A Scheduling Algorithm for Integrated Services Packet Switching Networks", [online] 12 pages, Retrieved Feb. 7, 2005, from: http://citeseer.ist.psu.edu/goyal96starttime.html.

* cited by examiner

*Primary Examiner*—Charles N Appiah
*Assistant Examiner*—Jaime M Holliday
(74) *Attorney, Agent, or Firm*—Fulbright & Jaworski L.L.P.

(57) ABSTRACT

Some representative embodiments are directed to controlling access to a wireless medium using "credit" periods and "free" periods. During a credit period, credits are initially assigned to the stations and each station is repetitively polled as long as the station has credit remaining and data is available to communicate. During the free periods, stations are polled using a start-time fair queuing algorithm. By dividing the access to the wireless medium in this manner, real time applications may use the credit periods to prevent communication latency from deteriorating application performance. Specifically, the repetitive occurrence of the credit periods and the assignment of credits to the stations ensures that each station will communicate at least at a minimum data rate. Additionally, controlling access to the wireless medium in this manner prevents frame collisions and, thereby, increases network throughput.

29 Claims, 3 Drawing Sheets

| Action | | | QUEUE(DEST_{tag-value}) 511 | | | | | UL TAG 512 | | | |
|---|---|---|---|---|---|---|---|---|---|---|---|
| | | | | | | HEAD | STATION | 1 | 2 | 3 | 4 |
| 501 | $t_0$, INIT | ... | $2_4$ | $1_4$ | $3_3$ | $2_2$ | $1_2$ | 1 | 2 | 3 | 4 |
| 502 | $t_1$, P + D 1 | ... | ... | $2_4$ | $1_4$ | $3_3$ | $2_2$ | 5 | 2 | 3 | 4 |
| 503 | $t_2$, P + D 2 | ... | ... | ... | $2_4$ | $1_4$ | $3_3$ | 5 | 5 | 3 | 4 |
| 504 | $t_3$, P + D 3 | ... | ... | ... | $3_6$ | $2_4$ | $1_4$ | 5 | 5 | 5 | 4 |
| 505 | $t_4$, P + D 1 | ... | ... | ... | $1_6$ | $3_6$ | $2_4$ | 9 | 5 | 5 | 4 |
| 506 | $t_5$, P + D 2 | ... | ... | ... | $2_6$ | $1_6$ | $3_6$ | 9 | 8 | 5 | 4 |
| 507 | $t_6$, P 4 | ... | ... | ... | $2_6$ | $1_6$ | $3_6$ | 9 | 8 | 5 | 8 |
| 508 | $t_7$, P + D 3 | ... | ... | ... | $3_9$ | $2_6$ | $1_6$ | 9 | 8 | 7 | 8 |

FIG. 6

SYSTEM AND METHOD FOR CONTROLLING ACCESS TO A WIRELESS MEDIUM

TECHNICAL FIELD

The present invention is generally related to wireless communications and, more particularly, to systems and methods for managing wireless communications using a credit-based coordination algorithm.

BACKGROUND

In communication systems, an important issue is controlling the transmission of data between multiple wireless devices to avoid conflicts between multiple concurrent transmissions. In general, this issue is addressed through the "medium access control" (MAC) layer of a communication protocol.

The carrier sense multiple access/collision avoidance (CSMA/CA) protocol is commonly used by MAC layers of communication protocols. In a wireless system employing the CSMA/CA, a wireless devices that has data to transmit first listens to the medium to detect whether any other wireless device is currently transmitting. If another device is already transmitting, the original wireless device will not begin transmitting. However, if the device does not detect any other wireless device transmitting, the device will begins its own transmission. It is possible that multiple wireless devices may examine the medium at the same time before attempting to transmit data. When transmissions are not detected by the multiple devices, the devices may concurrently transmit their data thereby causing a "collision." Upon detection of a collision, a "backoff" mechanism is used. Each device generates a random number that defines a time within a backoff window. The devices wait the defined times before attempting to transmit again. Unless each device generates the same random number, one device will attempt to transmit more quickly than the other device. Accordingly, a subsequent collision is avoided.

Wireless communication systems suffer from the "hidden node" problem that is not present in wired communication systems. Specifically, in a wired communication system, each device can detect the transmissions of every other device. However, in a wireless communication system, this is not always possible. For example, suppose a wireless communication system consists of three devices (devices A, B, and C). Device B is disposed on the outer communication limits of devices A and C. Also, devices A and C are separated by sufficient space that they cannot detect each other's transmission. Devices A and C may simultaneously attempt to transmit to device B. Because of the distance between devices A and C, the collision of conflicting transmissions at device B is not detected by either of devices A and C.

A number of mechanisms exist that address the hidden node problem. For example, the IEEE 802.11 protocol defines a frame exchange protocol for this purpose. When a wireless devices has a data frame to communicate and it does not detect that another device is transmitting, it first transmits a request to send (RTS) frame. The destination device communicates a clear to send (CTS) frame assuming that a collision has not occurred at the destination device. The CTS frame causes other devices within communication range of the destination to avoid communications for a period of time. Also, the CTS frame causes the original device to communicate the data frame. The destination device sends an acknowledgment frame after receiving the data frame. After the acknowledgment frame, other wireless devices may attempt to communicate.

This sequence of frames is referred to as the distributed coordination function (DCF) in the IEEE 802.11 standard. The DCF prevents repetitive collisions of data frames. However, the DCF function does not prevent collisions of the CTS and RTS frames themselves. If the traffic load of a network is high, network throughput and the fairness of the medium access allocation may degrade significantly.

The IEEE 802.11 standard also defines a point coordination function (PCF) to control access to the medium using the infrastructure network configuration. In an infrastructure network configuration, an access point controls a basic services set and provides a connection to a larger network. To implement the PCF, an access point includes a point controller (PC). From time to time, the PC takes control of the medium by broadcasting a beacon frame. The beacon frame contains an identification of the anticipated duration of the contention free period (CFP). Devices receiving the beacon frame set the duration in their network allocation vector (NAV) thereby preventing these devices from independently attempting to transmit during the CFP. Also, the PC communicates using the priority interframe space (PIFS) to ensure that newly arriving wireless devices do not attempt to transmit.

After the PC takes control of the medium, the PC begins polling devices identified in its polling list. Specifically, the PC sends a CF-Poll frame to a particular device to enable that device to transmit. If the device has data to transmit, it transmits a data frame. The PC transmits an acknowledgment frame upon receipt of the data frame. Also, during the CFP, the PC may distribute data frames to wireless devices. In order to make the use of the medium more efficient, the AP may combine polling, acknowledgment, and distributions functions using a single frame. At the end of the CFP, the PC transmits a CF-End frame and the wireless devices use the DCF to communicate.

SUMMARY

Some representative embodiments are directed to systems and methods for providing medium access control in a wireless network using an access point. In preferred embodiments, access to the medium is controlled using "credit" periods and "free" periods. In both of the credit and free periods, contention free access occurs by causing stations to communicate in response to polling by the access point. The credit period is used to ensure that selected stations are able to communicate at least a defined amount of data within each communication interval. The defined amount of data may be used to support real time applications (i.e., applications that would otherwise exhibit unacceptable performance due to communication latency). The free period is used to communicate data for applications that are not appreciably affected by communication latency. By managing access to the medium in this manner, some representative embodiments provide a "quality of service" (QoS) environment.

During the credit period of some representative embodiments, stations operating applications that would degrade upon latency of data communication are assigned "credits" at the beginning of each credit period. The credits may be related to the amount of bandwidth appropriate to ensure suitable operation of the real time applications. In operation, the access point repetitively may poll the stations according to the outstanding amounts of credits. When data is uploaded from stations, the credits are preferably decreased accordingly. The credit period may end when all of the stations have expended their credits. Alternatively, the credit period ends when there is no more data for stations having non-zero credit to be communicated. The allocation and management of credits in association with polling operations enables the respective stations to communicate a defined amount of data during the credit period.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
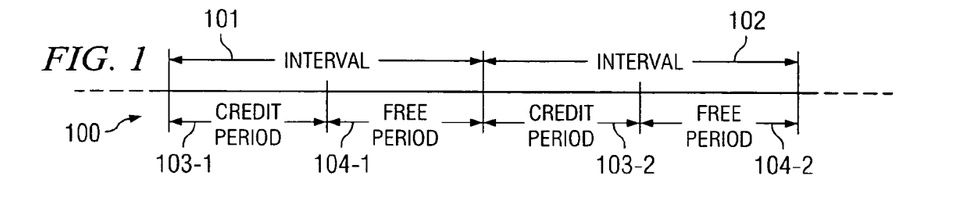
FIG. 1 depicts a timeline of wireless communication according to one representative embodiment.

FIG. 1 depicts timeline 100 of wireless communication according to one representative embodiment. In a preferred embodiment, the wireless communication is divided, in the temporal domain, into intervals (intervals 101 and 102 shown in FIG. 1). The intervals are further divided, in the temporal domain, into credit periods (103-1 and 103-2) and free periods (104-1 and 104-2). During the credit periods, stations in the wireless network are polled according to assigned credits. The assigned credits enable elected stations to communicate at least a defined amount of data within each communication interval. For example, real time applications may use this functionality to maintain the quality of service. Examples of real time applications may include voice telephony applications, audio applications, video applications, real time device control applications, and the like. The length of the credit periods and/or the free periods may be dynamically varied in response to the number of stations communicating real time data traffic if desired.

During the free periods, stations may be polled according to a fair queuing algorithm. The free period may be used to communicate data for applications that are relatively insensitive to communication latency or nay other suitable data. For example, e-mail application data may be communicated during the free period.

Figure 2:
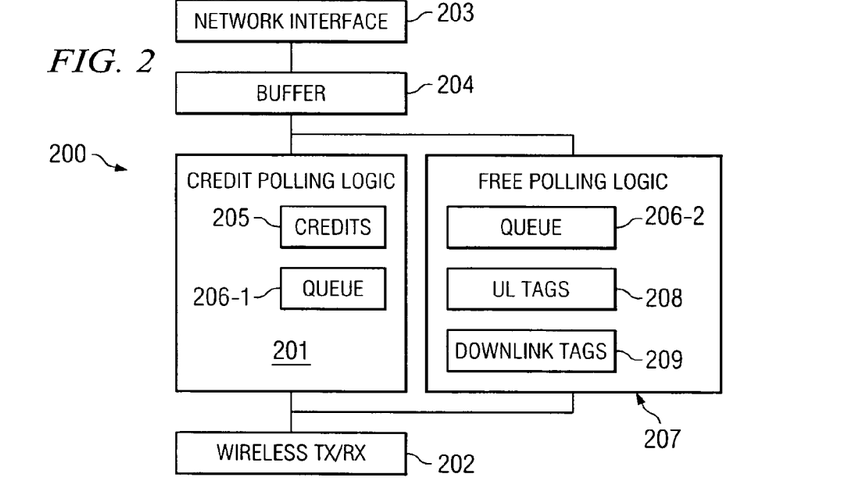
FIG. 2 depicts an access point that controls access to a wireless communication medium according to one representative embodiment.

FIG. 2 depicts access point 200 that controls access to a wireless medium according to one representative embodiment. Access point 200 includes credit polling logic 201 and free polling logic 207 that poll stations within a wireless network according to respective contention free periods. To support distribution of data according to the respective periods, credit polling logic 201 and free polling logic 207 maintain separate queues 206-1 and 206-2. In one representative embodiment, data associated with real time applications may be identified by examining various packet headers. For example, protocol and port identifiers may be examined to identify whether data is associated with a real time application or an application that is relatively insensitive to latency. Additionally, access point 200 may also include any other typical access point functionality such as wireless transceiver 202, network interface 203, buffer 204, and/or the like.

Credit polling logic 201 of the illustrated embodiment polls stations within the wireless network controlled by access point 200 using credit store 205. Specifically, at the beginning of each credit period, credit polling logic 201 loads a credit amount into credit store 205 for each participating station. The credit amount is related to the amount of data that the station will be allowed to communicate during the respective credit period. In one representative embodiment, the credits are assigned as follows:

$$C_{ij}=\text{credit\_period}_j(\text{second})/2 * \text{link\_bandwidth}(\text{bps})/\text{num\_stations},$$

where $C_{ij}$ is the credit for slave i in interval j, $\text{credit\_period}_j$ is duration of the credit period, link_bandwidth is estimated wireless link bandwidth, and num_stations is the number of stations in the wireless network.

In other embodiments, credits can be assigned in a non-uniform manner. For example, some stations may execute applications requiring additional communication resources. Additionally, some stations may be inactive or otherwise have no data to communicate during the credit period. Such stations may be assigned zero credits. Credits may be assigned for both uplink and downlink communications. The same credit value may be assigned for both the uplink and downlink directions. Alternatively, difference credit values may be assigned if desired. The allocation of credits can be adapted to the characteristics of a particular wireless network and supported applications.

Free polling logic 207 enables communication of data for applications that are relatively insensitive to communication latency. In a preferred embodiment, free polling logic 207 implements a "fair queuing" algorithm. Fair queuing algorithms are known in the art. A discussion of a fair queuing algorithm is given in "Start-time Fair Queuing: A Scheduling Algorithm for Integrated Services Packet Switching Networks," IEEE/ACM Transactions on Networking, vol. 5, no. 5, pp. 690-704, October 1997, which is incorporated herein by reference. The concept of "fairness" in the allocation of a wireless communication medium refers to the approximate equal allocation of bandwidth in each time interval to communicating stations within the wireless network. To support the fair queuing algorithm, uplink tags 208 and downlink tags 209 are maintained by free polling logic 207.

In one representative embodiment, the functionality of credit polling logic 201 and free polling logic 207 is implemented using a processor, suitable executable instructions, and memory resources. In another representative embodiment, the functionality of credit polling logic 201 and free polling logic 207 may be implemented using integrated circuitry.

Figure 3:
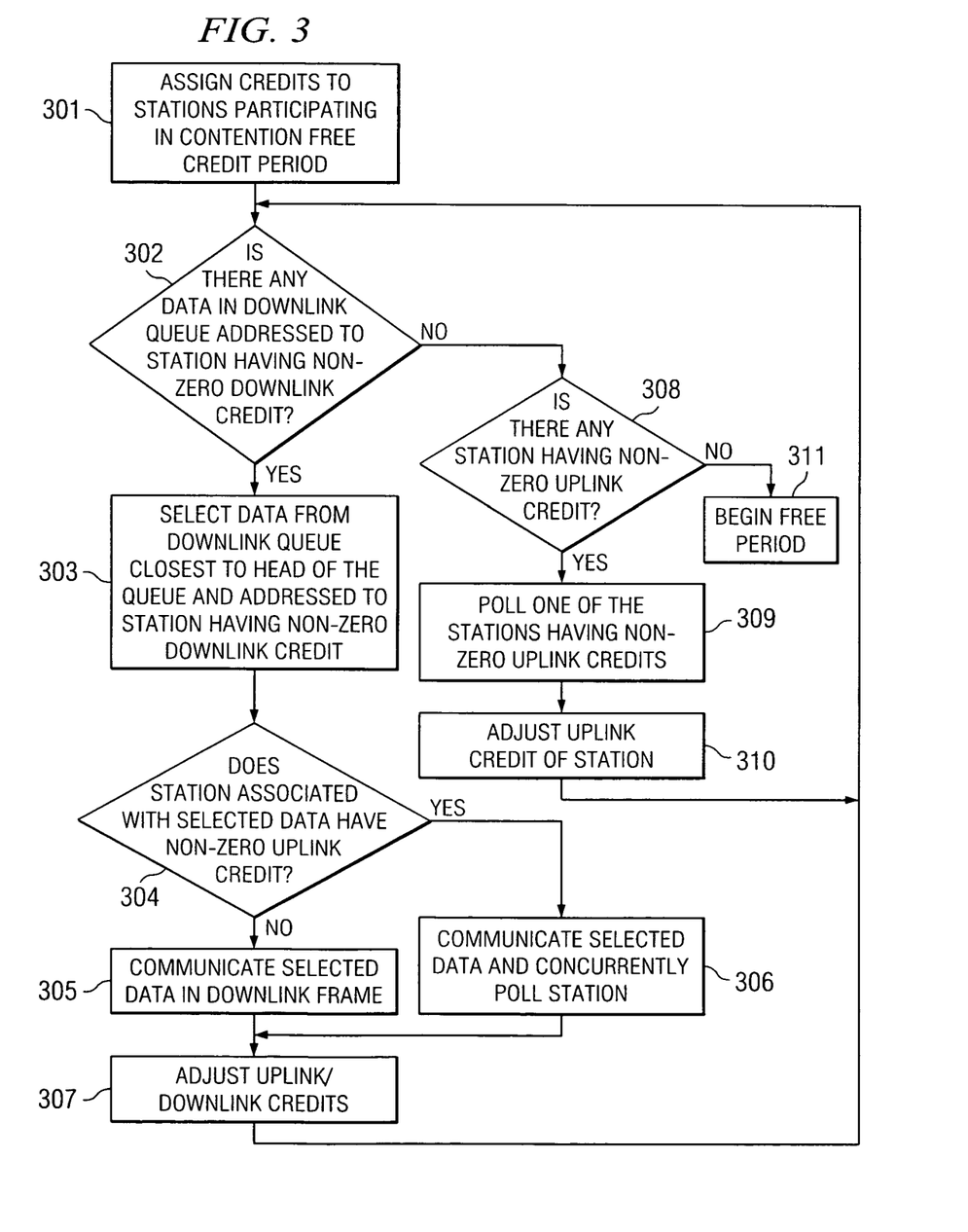
FIG. 3 depicts a flowchart for operation of a contention free period using credits according to one representative embodiment.

FIG. 3 depicts a flowchart for operating a contention free period using uplink and downlink credits according to one representative embodiment. In this example, stations are only allowed to communicate uplink frames if the stations have non-zero uplink credit. Also, stations are only are sent downlink frames if the stations have non-zero downlink credit. Other embodiments may employ different data distribution rules. For example, a station may be polled for uplink data when it receives a downlink frame even if it possess zero uplink data.

In step 301, uplink and downlink credits are assigned to stations participating in the contention free credit period. For example, credit poling logic 201 may set the initial values in credit store 205 at the beginning of a credit period. In step 302, a logical comparison is made to determine whether there is any data in the downlink queue addressed to a station having non-zero downlink credit. If not, the process flow proceeds to step 308. If there is data addressed to a station having non-zero credit, the process flow proceeds to step 303.

In step 303, the data closest to the head of the queue and addressed to a station having non-zero downlink credit is selected. In step 304, a logical comparison is made to determine whether the station associated with the selected data has non-zero uplink credit. If not, the process flow proceeds to step 305 wherein the data is communicated to the station in a downlink frame. If the station has non-zero uplink credit, the process flow proceeds from step 304 to step 306. In step 306, the data is communicated to the station in a frame and the station is concurrently polled for uplink data. If the station has uplink data to communicate, it responds to the poll by communicating the an uplink frame. From both steps 305 and 306, the process flow proceeds to step 307 where the uplink and downlink credits are adjusted. The credits are reduced by the size of the downlink and uplink frames, respectively. If the polled station did not have data to upload, its uplink credit may be set to zero. From step 307, the process flow returns to step 302.

In step 308, a logical comparison is made to determine whether there is any station having non-zero uplink credit. If the logical comparison is true, the process flow proceeds to step 309 where a station having non-zero uplink credit is polled. If the polled station has uplink data to communicate, it communicates an uplink frame. In step 310, the credit of that station is adjusted. From step 310, the process flow returns to step 302.

If the logical comparison of step 308 determines that no stations have non-zero uplink credit, the process flow proceeds to step 311. In step 311, the free period begins where stations are polled using a fair queuing algorithm.

Figure 4:
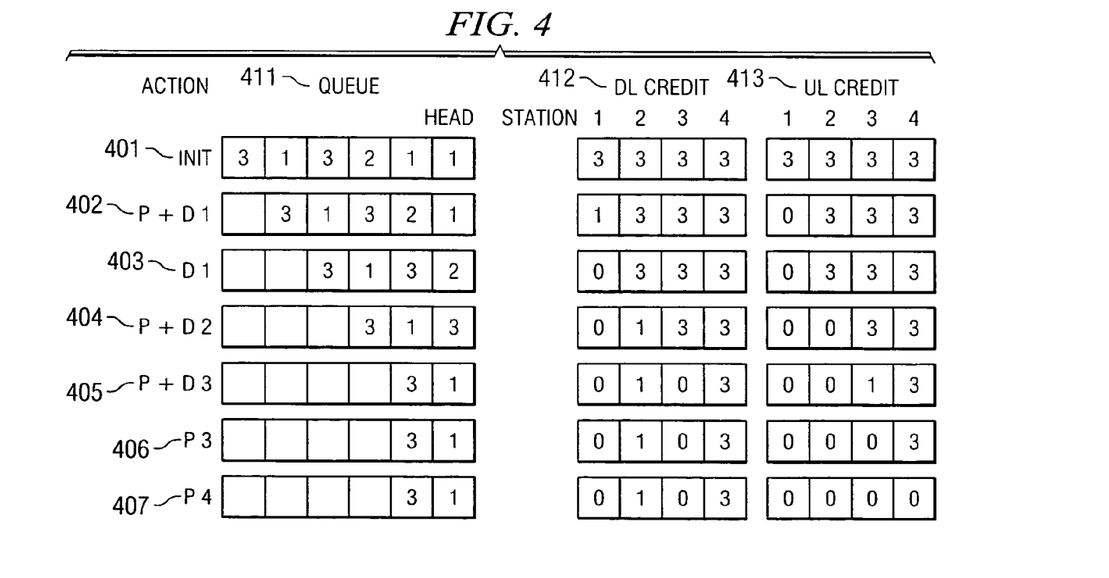
FIG. 4 depicts a queue and credits assigned to stations of a wireless network over several steps of a credit period according to one representative embodiment.

To illustrate the management of access to a wireless medium using credits according to one representative embodiment, reference is made to FIG. 4. FIG. 4 depicts tables for queue 411, downlink credits 412, and uplink credits 413 for a number of steps. The entries within queue 411 depict the destination of the frame at the respective position in queue 411. Downlink credits 412 and uplink credits 413 depict the management of credits associated with each station as polling operations occur. In this example, it is assumed that the size of the frames used by stations 1-4 varies. The size of downlink frames for stations 1 and 2 is two units and the size of downlink frames for station 3 is three units. The size of uplink frames for stations 1 and 4 is four units and the size of uplink frames for station 3 is three packets. During this credit period, it is assumed that there are no downlink packets for station 4 and that there are no uplink packets from station 2.

Initially each station is assigned three uplink credits and three downlink credits. Also, in step 401, the head of queue 411 is addressed to station 1. In one embodiment, access point 200 uses the frame definition of the IEEE 802.11 wireless communication standard to perform several functions with a single frame. According to the IEEE 802.11 wireless communication standard, a single frame from the access point may be used to communicate data to a particular station, to poll that station for an uplink frame, and to acknowledge a frame received from that station or another station. The use of IEEE 802.11 frames is advantageous, because some embodiments may be implemented by employing suitable logic within point controller devices while allowing the wireless stations to be standard 802.11 compliant devices. Although one embodiment uses the IEEE 802.11 wireless communication standard, any suitable wireless protocol that enables access to the wireless medium to be controlled through polling operations may be used. According to the IEEE 802.11 standard, access point 200 polls station 1 with the same frame (a "CC-Poll+CC+Data" frame) used to download the data from queue 411. Access point 200 adjusts the credits associated with station 1 in response to the downlink and uplink frames.

In step 402, the data at the head of queue 411 is addressed to station 1. Station 1 has one downlink credit remaining and zero uplink credits remaining. Access point 200 communicates the data from the head of queue 411 to station 1 with a "CC-Data" frame. However, access point 200 does not poll station 1 to enable station 1 to upload additional data, because station 1 has zero uplink credits remaining. In step 403, access point 200 communicates the data at the head of queue 411 to station 2 and concurrently polls station 2. In this example, station 2 does not possess data to upload. Accordingly, when access point 200 does not receive an uplink data frame, access point 200 sets the uplink credit of station 2 to zero. Also, access point 200 reduces station 2's downlink credit by two credits. In step 404, access point 200 communicates the data at the head of queue 411 to station 3 and polls station 3. Station 3 uploads a frame in response to the poll. Access point 200 adjusts the uplink and downlink credits appropriately. In steps 405 and 406, there is no data in queue 411 addressed to stations having non-zero downlink credit. Accordingly, the credit period ends by polling stations 3 and 4 until their uplink credits equal zero.

In the free period of one representative embodiment, stations are polled by access point 200 using a weighted fair queuing algorithm. In one embodiment, each uploaded packet is stamped with a "finish tag." Specifically, the i packet from slave c is tagged with a finish tag $F(p_c^i)$ calculated in the following manner:

$$S(p_c^i) = \max\{v(A(p_c^i)), F(p_c^{i-1})\} \ldots i >= 1$$

$$F(p_c^i) = S(p_c^i) + 1_c^i/r_c \ldots i >= 1$$

where $S(p_c^i)$ is the start tag of packet i from slave c, v(t) is the start tag of the packet in service at time t, A(p) is the arrival time of packet p, $r_c$ is the weight of slave c, and $1_c^i$ is the length of packet i of slave c.

In some representative embodiments, uplink finish tags are also maintained for each station. In one representative embodiment, a station is polled or a frame is downloaded to the station upon the basis of the lowest station uplink finish tag or packet finish tag.

Figure 5:
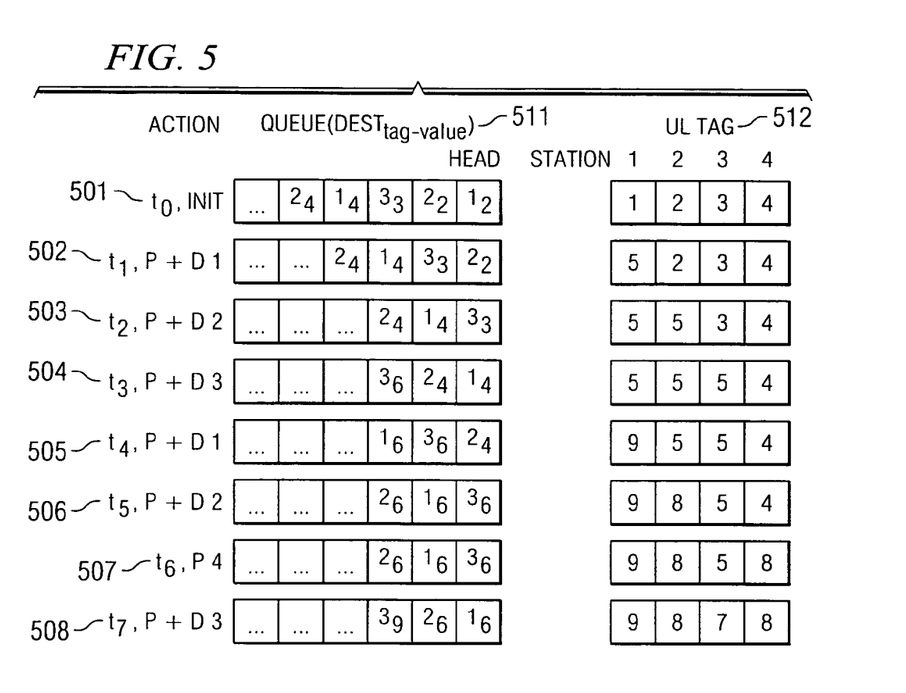
FIG. 5 depicts another queue and credits assigned to stations of a wireless network over several steps of a free period according to one representative embodiment.

To illustrate the management of access to a wireless medium using a modified weighted fair queuing algorithm, reference is made to FIG. 5. FIG. 5 depicts tables for queue 511 and uplink tags 512 for several steps of a free period according to one representative embodiment. The entries in queue 511 are of the form $DEST_{tag}$, where DEST identifies the destination station of the data and the subscript tag represents the downlink finish tag of the data. For the purposes of this example, it is assumed that the weights of stations 1-4 are equal to one. Also, the downlink frame size of stations 1 and 2 is two units and the downlink size of station 3 is three units. The uplink frame sizes of stations 1-4 are four, three, two, and four, respectively.

The polling and downloading of FIG. 5 varies from typical fair weighting algorithms by combining polling and distribution activities. By using the combination, it is possible that a station without the lowest finish tag is given the opportunity to upload a packet. This possibility may cause a short term unfairness. However, the short term unfairness is mitigated by the optimization of the wireless medium through the combination of access point activities. Accordingly, in some representative embodiments, the polling of the free period enables substantially fair access to the medium, i.e., stations generally receive the same amount of access except for minor deviations to enable frames to be combined, to address the endpoint of the free period, and to address inactive stations.

In step 501, a "CC-Data+CC-Poll" frame is sent to station 1, because the uplink tag value of station one is lower than any other uplink tag or downlink tag. After step 501, the uplink tag of station 1 is incremented to five from one (the uplink frame size of station 1 is four) according to the fair queuing algorithm. Similar operations occur in steps 502 and 503 for stations 2 and 3.

In step 504, the data at the head of queue 511 is selected for communication, because its tag value is less than or equal to the other tag values. The destination of the data is station 1. A "CC-Data+CC-Poll" frame is sent to station 1. Station 1 is allowed to upload a frame even though the uplink tag of station 1 is greater than the uplink tags of stations 2-4. The unfairness causes by polling station 1 is mitigated by the increased efficiency of using a single frame for data distribution and polling functions.

In step 505, station 2 receives data and is polled. In step 506, station 4 is polled, because its uplink tag has a value lower than all other tags. However, there is no data in the queue addressed to station 4 and, hence, there is no concurrent distribution of data to station 4. In step 507, station 3 receives data and is concurrently polled. The fair queuing step ends at step 508 where station 1 receives data.

When a station does not possess packets to transmit for one or several steps, the downstream tagging process may use the $v(A(p_c^i))$ term. Following the convention of known SFQ algorithms, the downstream tag for an inactive station that resumes communications may equal $v(t)+1/r$, where $v(t)$ is the minimum start time, 1 is the packet size for the station, and r is the weight assigned to the station. For upstream packets, upstream tags may be assigned the largest tag-value of the other outstanding upstream tags. By assigning upstream tags in this manner, the polling frequency of stations varies depending upon the traffic load experienced the communication system. When the system is relatively highly loaded, the polling of inactive stations would occur less frequently.

Because the end of a credit period may vary, the duration of the following free period may also be varied to maintain QoS objectives. For example, access point 200 may calculate the expected endpoint of the free period that is consistent with QoS objectives, i.e., to ensure that the next credit period occurs within time to maintain a desired amount of bandwidth for each respective station. As packets are communicated during the free period, access point 200 may analyze the frame type of packets against the expected endpoint. If the amount of time remaining until the expected endpoint is greater than 2 times the maximum packet transmission time (MPTT), all frames types are allowed to be sent. If the amount of time is greater than MPTT, only Data-CC-Poll and Data-CC-Poll+CC-Ack are sent. If the amount of time is less than MPTT, then the current free periods ends and the next credit period begins.

Figure 6:
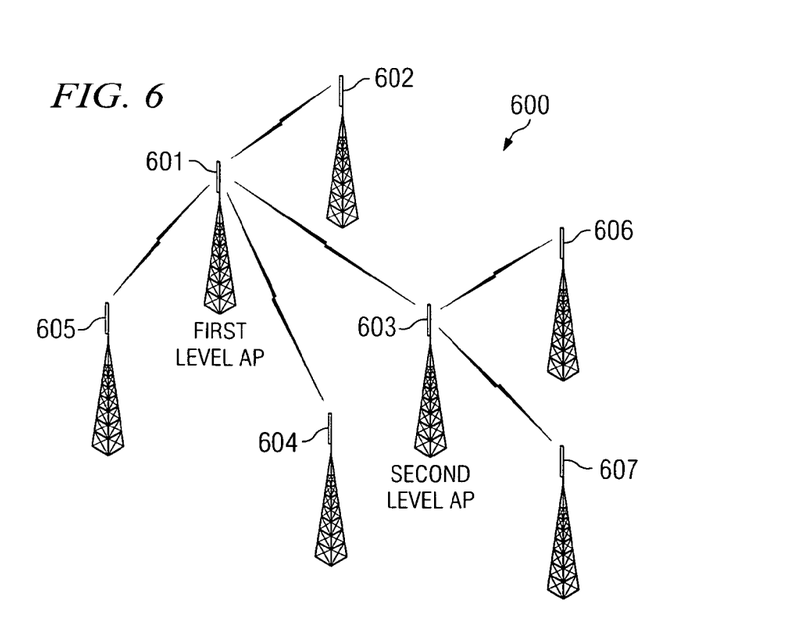
FIG. 6 depicts a wireless distributed system according to one representative embodiment.

FIG. 6 depicts wireless distributed system 600 according to one representative embodiment. Wireless distributed system 600 includes a multi-level architecture where a "central" server is communicatively coupled to a number of "regional" servers to form a star topology. At the lowest level of the architecture, wireless distributed system 600 comprises access point 601 (the central server) and stations 602, 603, 604, and 605. Access point 601 may be coupled to a larger network (not shown) to be accessed by the lower level stations. Additionally, access point 601 divides the medium between stations 602-605 by polling stations 602-605 using credit periods and free periods. Station 603 (a regional server) controls second level of wireless distributed system 600. Specifically, acting as a second level access point, station 603 may poll stations 606 and 607 using credit periods and free periods. Separate frequency channels or other suitable channels may be assigned for communications controlled by access point 601 and station 603. To enable access to the larger network, station 603 may route packets from stations 606 and 607 to access point 601 and vice versa.

The use of credit periods and free periods to control access to the wireless medium in system 600 may enable a number of advantages as compared to known medium access techniques. For example, stations 602-607 of wireless distribution system 600 may be separated by relatively large distances. Also, stations 602-607 may employ directional antennas. Accordingly, stations 602-607 may not be able to detect the transmissions of each other. Without the operation of the polling functionality according to one representative embodiment, a significant number of collisions could occur at access point 601 and station 603. When the utilization of the wireless medium exceeds minimal levels, the collisions would cause appreciable degradation of network throughput. However, according to one representative embodiment, stations 602-607 only communicate when polled and, hence, collisions do not occur. Moreover, by appropriately setting the credits for stations 601-607, QoS objectives may be obtained thereby enabling acceptable performance of real-time applications on these stations. Also, the polling may occur in a "fair" manner thereby preventing any single station from inappropriately monopolizing the medium.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for providing medium access control in a wireless network, comprising:
repetitively initiating a first contention free period, wherein credits are assigned to stations within said wireless network according to data transmission requirements and communicating with said stations occurs according to said credits during said first contention free period, and further wherein said credits are decremented upon communication with said stations; and
repetitively initiating a second contention free period, wherein said stations are provided substantially fair communication access during said second contention free period.

2. The method of claim 1 wherein said stations are polled using a weighted fair queuing algorithm during said second contention free period.

3. The method of claim 2 further comprising:
maintaining at least one of upstream and downstream tags during said second contention free period, wherein communications with said stations occur according to a lowest tag value.

4. The method of claim 2 further comprising:
assigning a highest tag value of outstanding frames to inactive stations during said second contention free period.

5. The method of claim 1 wherein each first contention free period is immediately followed by a respective second contention free period and each second contention free period is immediately followed by a respective first contention free period.

6. The method of claim 5 further comprising:
controlling a duration of said second contention free period to be less than or equal to a predetermined amount of time.

7. The method of claim 6 wherein said predetermined amount of time is varied by a number of stations communicating real time data traffic.

8. The method of claim 6 wherein said predetermined amount of time is varied by a duration of the immediately preceding first contention free period.

9. The method of claim 1 wherein an amount of credit assigned to a station is reduced in relation to a size of a frame communicated with said station during said first contention free period.

10. The method of claim 1 wherein polling during said first and second contention free periods is performed using frames defined by the IEEE 802.11 wireless communication standard.

11. The method of claim 1 wherein only packets generated for real time applications are communicated during said first contention free period.

12. A system for controlling access to a wireless medium of a wireless network, comprising:
means for communicating with stations during first contention free periods by assigning credits to said stations at beginnings of said first contention free periods, decrementing said credits upon communication with said stations, and ending said first contention free periods when no data is available for communication to stations having non-zero credit; and
means for communicating with stations during second contention free periods by providing substantially fair access to said wireless medium during said second contention free periods.

13. The system of claim 12 wherein said means for communicating with stations during first contention free periods maintains upstream and downstream credits for said stations.

14. The system of claim 12 wherein said means for communicating with stations during first contention free periods assigns a value of zero to an upstream credit amount of a station that does not upload data in response to a poll frame.

15. The system of claim 12 wherein said means for communicating with stations during first contention free periods decrements credits according to sizes of frames communicated with said stations.

16. The system of claim 12 wherein said means for communicating with stations during second contention free periods examines an amount of time remaining until said means for communicating with stations during first contention free periods is expected to resume operations as a condition to communicating with said stations.

17. The system of claim 12 wherein said means for communicating with during second contention free periods varies a duration of said first contention free periods in response to a number of stations communicating data for real time applications.

18. The system of claim 12 wherein said means for communicating with during second contention free periods employs a start-time fair queuing algorithm.

19. The system of claim 12 wherein said means for communicating with during said first contention free periods and said means for polling during second contention fee periods use frames defined by the IEEE 802.11 wireless communication standard.

20. A distributed wireless communication system, comprising:
a first access point for controlling communications with stations over a first communication channel;
a second access point for controlling communications with stations over a second communication channel;
said first and second access points communicating with stations according to first and second contention free periods, wherein communications during said first contention free period occur in response to credits assigned to stations, further wherein said credits are decremented upon communication with stations, and wherein communications during said second contention free period occur in response to a fair queuing algorithm;
wherein said second access point routes packets from stations to said first access point in response to polling by said first access point.

21. The distributed wireless communication system of claim 20 wherein said fair queuing algorithm assigns at least one of upstream tags and downstream tags using weights assigned to stations.

22. The distributed wireless communication system of claim 20 wherein a duration of said second contention free period is varied in response to a duration of a preceding first contention free period.

23. The distributed wireless communication system of claim 20 wherein said stations communicate data for real time applications during said first contention free period.

24. The distributed wireless communication system of claim 20 wherein credits are decremented in response to sizes of frames communicated during said first contention free period.

25. A method for controlling communications in a wireless network, comprising:
- receiving data at a point controller device of said wireless network;
- determining whether said received data is associated with a real time application;
- queuing said data in response to said determining; and
- communicating data from a queue storing data associated with real time applications during contention free periods, wherein during said contention free periods: (i) credits are assigned to stations at beginnings of said contention free periods, (ii) data is communicated to stations having non-zero credits, and (iii) said credits are decremented in response to communication of data.

26. The method of claim 25 further comprising:
- initiating said contention free periods at least at a frequency selected to satisfy a quality of service objective.

27. The method of claim 25 wherein said determining examines said received data to determine a communication protocol associated with said received data.

28. The method of claim 25 wherein said determining examines a port associated with said received data.

29. The method of claim 25 wherein said queuing comprises:
- storing data associated with real time applications in a first queue; and storing data associated with other applications in a second queue.

* * * * *

UNITED STATES PATENT AND TRADEMARK OFFICE
CERTIFICATE OF CORRECTION

PATENT NO. : 7,653,034 B2  Page 1 of 1
APPLICATION NO. : 10/984172
DATED : January 26, 2010
INVENTOR(S) : Sammy M. Chau et al.

It is certified that error appears in the above-identified patent and that said Letters Patent is hereby corrected as shown below:

In the Claims:

Column 10, Claim 19, Line 32, delete the portion of text reading "fee" and replace with --free--.

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,653,034 B2 |
| APPLICATION NO. | : 10/984172 |
| DATED | : January 26, 2010 |
| INVENTOR(S) | : Chau et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1478 days.

Signed and Sealed this

Twenty-third Day of November, 2010

David J. Kappos
*Director of the United States Patent and Trademark Office*